US012803183B2

(12) United States Patent
Wang et al.

(10) Patent No.: US 12,803,183 B2
(45) Date of Patent: Nov. 17, 2026

(54) RADIO FREQUENCY (RF) PHASED-ARRAY DETECTOR

(71) Applicant: TRON FUTURE TECH INC., Hsinchu City (TW)

(72) Inventors: Yu-Jiu Wang, Hsinchu City (TW); Bor-Ching Su, Hsinchu City (TW); Chien Cheng Wang, Hsinchu City (TW)

(73) Assignee: TRON FUTURE TECH INC., Hsinchu City (TW)

( * ) Notice: Subject to any disclaimer, the term of this patent is extended or adjusted under 35 U.S.C. 154(b) by 62 days.

(21) Appl. No.: 18/429,930

(22) Filed: Feb. 1, 2024

(65) Prior Publication Data

US 2024/0413545 A1 Dec. 12, 2024

Related U.S. Application Data

(60) Provisional application No. 63/486,848, filed on Feb. 24, 2023.

(51) Int. Cl.
*H04B 1/16* (2006.01)
*H01Q 21/20* (2006.01)
(Continued)

(52) U.S. Cl.
CPC ......... *H01Q 21/293* (2013.01); *H01Q 21/205* (2013.01)

(58) Field of Classification Search
CPC .... H01Q 21/293; H01Q 21/205; H01Q 21/24; H01Q 21/20; H01Q 21/28; H01Q 3/267;
(Continued)

(56) References Cited

U.S. PATENT DOCUMENTS 6,584,144 B2 * 6/2003 Alamouti ................ H04J 13/16 375/150
12,212,356 B2 * 1/2025 Pehlke ................ H04B 1/0057
(Continued)

FOREIGN PATENT DOCUMENTS

WO WO-2018156825 A1 * 8/2018 ............... G01S 5/12

OTHER PUBLICATIONS

WO-2018156825-A1 Translation (Year: 2018).*
(Continued)

*Primary Examiner* — Dameon E Levi
*Assistant Examiner* — Gurbir Singh
(74) *Attorney, Agent, or Firm* — WPAT, P.C.; Anthony King

(57) ABSTRACT

A radio frequency (RF) phased-array detector includes a vertical antenna array, a horizontal antenna array, a multiplexer module and a processor. The vertical antenna array includes a plurality of vertical antennas, and each of the vertical antennas is configured to obtain a first input signal in response to a wireless signal from a radio-emitting source. The horizontal antenna array includes a plurality of horizontal antennas, and each of the horizontal antennas is configured to obtain a second input signal in response to the wireless signal. The multiplexer module is configured to provide a plurality of third input signals selected from the first input signals and the second input signals. The processor is configured to obtain azimuth and elevation of the radio-emitting source according to the third input signals.

18 Claims, 15 Drawing Sheets

(51) Int. Cl.
*H01Q 21/29* (2006.01)
*H04B 1/18* (2006.01)

(58) Field of Classification Search
CPC ...... H04B 7/0404; H04B 3/26; H04B 7/0691; H04B 1/16; H04B 1/04; H04B 1/18; H04B 7/0617; H04B 7/0413; H04B 1/0057; H04B 1/44; H04B 7/0802; H04B 7/0874
See application file for complete search history.

(56) References Cited

U.S. PATENT DOCUMENTS

| | | | | |
|---|---|---|---|---|
| 2002/0028666 | A1 | 3/2002 | Nakagawa et al. | |
| 2021/0218449 | A1 | 7/2021 | Kim et al. | |
| 2022/0359983 | A1 * | 11/2022 | Kang | H01Q 21/20 |
| 2022/0384956 | A1 | 12/2022 | Alpman et al. | |
| 2022/0416445 | A1 | 12/2022 | Dickey et al. | |

OTHER PUBLICATIONS

Office action dated Jul. 31, 2024 from the Taiwan corresponding application 113104053.
English brief translation of the office action dated Jul. 31, 2024 from the Taiwan corresponding application 113104053.
European search report issued by European Patent Office on Jul. 22, 2024.

* cited by examiner

| Channel | Single Antenna Mode | Omnidirectional Mode |
|---|---|---|
| CH0 | AH0 or AH8 or AV0 | Weighted power sum of {AH0, AH4, AH8, AH12} |
| CH1 | AH1 or AH9 or AV1 | Weighted power sum of {AH1, AH5, AH9, AH13} |
| CH2 | AH2 or AH10 or AV2 | Weighted power sum of {AH2, AH6, AH10, AH14} |
| CH3 | AH3 or AH11 or AV3 | Weighted power sum of {AH3, AH7, AH11, AH15} |
| CH4 | AH4 or AH12 or AV4 | Weighted power sum of {AH0, AH4 , AH8, AH12} |
| CH5 | AH5 or AH13 or AV5 | Weighted power sum of {AH1, AH5, AH9, AH13} |
| CH6 | AH6 or AH14 or AV6 | Weighted power sum of {AH2, AH6, AH10, AH14} |
| CH7 | AH7 or AH15 or AV7 | Weighted power sum of {AH3, AH7, AH11, AH15} |

FIG. 5

| Band-Pass Filter | Frequency Band (Passband) |
|---|---|
| $430_1$ | BD1 |
| $430_2$ | BD2 |
| $430_3$ | BD3 |
| $430_4$ | BD4 |
| $430_5$ | BD5 |
| $430_6$ | BD6 |
| $430_7$ | BD7 |
| $430_8$ | BD8 |
| $430_9$ | BD9 |
| $435_1$ | WBD1={BD1, BD2, BD3} |
| $435_2$ | WBD2={BD4, BD5, BD6} |
| $435_3$ | WBD3={BD7, BD8, BD9} |

FIG. 8

| Channel | Self-Calibration Mode | Bypass Mode | Jamming Mode |
|---|---|---|---|
| CH0 | Cal0 or AH0 or AH8 or AV0 or Weighted power sum of {AH0, AH4,AH8,AH12} | X | AH0 or AH8 or AV0 or Weighted power sum of {AH0, AH4,AH8,AH12} |
| CH1 | Cal1 or AH1 or AH9 or AV1 or Weighted power sum of {AH1, AH5,AH9,AH13} | X | AH1 or AH9 or AV1 or Weighted power sum of {AH1, AH5,AH9,AH13} |
| CH2 | Cal2 or AH2 or AH10 or AV2 or Weighted power sum of {AH2, AH6,AH10,AH14} | X | AH2 or AH10 or AV2 or Weighted power sum of {AH2, AH6,AH10,AH14} |
| CH3 | Cal3 or AH3 or AH11 or AV3 or Weighted power sum of {AH3, AH7,AH11,AH15} | X | AH3 or AH11 or AV3 or Weighted power sum of {AH3, AH7,AH11,AH15} |
| CH4 | Cal4 or AH4 or AH12 or AV4 or Weighted power sum of {AH0, AH4,AH8,AH12} | X | AH4 or AH12 or AV4 or Weighted power sum of {AH0, AH4,AH8,AH12} |
| CH5 | Cal5 or AH5 or AH13 or AV5 or Weighted power sum of {AH1, AH5,AH9,AH13} | X | AH5 or AH13 or AV5 or Weighted power sum of {AH1, AH5,AH9,AH13} |
| CH6 (RX Only) | Cal6 or AH6 or AH14 or AV6 or Weighted power sum of {AH2, AH6,AH10,AH14} | X | AH6 or AH14 or AV6 or Weighted power sum of {AH2, AH6,AH10,AH14} |
| CH7 (RX Only) | Cal7 or AH7 or AH15 or AV7 or Weighted power sum of {AH3, AH7,AH11,AH15} | X | AH7 or AH15 or AV7 or Weighted power sum of {AH3, AH7,AH11,AH15} |
| RXA | TX_CH6 | Sum of {AV0 ~ AV7} | X |
| RXB | TX_CH7 | Sum of {AV0 ~ AV7} | X |

FIG. 11

RADIO FREQUENCY (RF) PHASED-ARRAY DETECTOR

PRIORITY CLAIM AND CROSS-REFERENCE

The present application claims priority to U.S. Provisional Patent Application No. 63/486,848, filed on Feb. 24, 2023, which is incorporated by reference herein in its entirety.

BACKGROUND

The present disclosure relates to a phased array and, more particularly, to a radio frequency (RF) phased-array detector with vertical antennas and horizontal antennas.

Phased-array antennas gain popularity for use in wireless communication such as 5G communication networks or low Earth orbit (LEO) satellite constellations. A phased array system can utilize beamforming and beamsteering techniques to form and steer the radiation pattern in various directions. For example, input power and relative phasing of each antenna in the phased array system can be controlled to change the direction and shape of radiated signals without any physical movement of the antenna. The radiation pattern is electronically steered according to the phase difference between the radiated signals. The phased array system can intelligently combine a number of individual antennas to achieve improved signal strength, gain and directivity. In addition, the phased array system can produce numbers of beams and realize a wide coverage.

SUMMARY

The described embodiments provide radio frequency (RF) phased-array detectors having a plurality of vertical antennas in vertical antenna array and a plurality of horizontal antennas in horizontal antenna array.

In some embodiments, an RF phased-array detector is provided. The RF phased-array detector includes a vertical antenna array, a horizontal antenna array, a multiplexer module and a processor. The vertical antenna array includes a plurality of vertical antennas, and each of the vertical antennas is configured to obtain a first input signal in response to a wireless signal from a radio-emitting source. The horizontal antenna array includes a plurality of horizontal antennas, and each of the horizontal antennas is configured to obtain a second input signal in response to the wireless signal. The multiplexer module is configured to provide a plurality of third input signals selected from the first input signals and the second input signals. The processor is configured to obtain azimuth and elevation of the radio-emitting source according to the third input signals.

In some embodiments, an RF phased-array detector is provided. The RF phased-array detector includes a first antenna array, a second antenna array, a multiplexer network, and a processor. The first antenna array includes a plurality of first antennas arranged in a straight line, and each of the first antennas is configured to obtain a first input signal in response to a wireless signal from a radio-emitting source. The second antenna array includes a plurality of second antennas arranged in a plane non-parallel to the straight line, and each of the second antennas is configured to obtain a second input signal in response to the wireless signal. The multiplexer network is configured to provide a third input signal according to the first and second input signals. The processor is configured to obtain azimuth and elevation of the radio-emitting source according to the third input signal. In a first mode, the third input signal is a single input signal selected from the first and second input signals, and in a second mode, the third input signal is a combined input signal comprising more than one the second input signal.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a table illustrating selected input signals corresponding to different channels in different modes of operation in accordance with some embodiments of the present disclosure.

FIG. 8 is a table illustrating frequency band relationship between the band-pass filters with different frequency bands in accordance with some embodiments of the present disclosure.

FIG. 11 is a table illustrating selected input signals corresponding to different channels in different modes of operation in accordance with some embodiments of the present disclosure.

DETAILED DESCRIPTION

Figure 1:
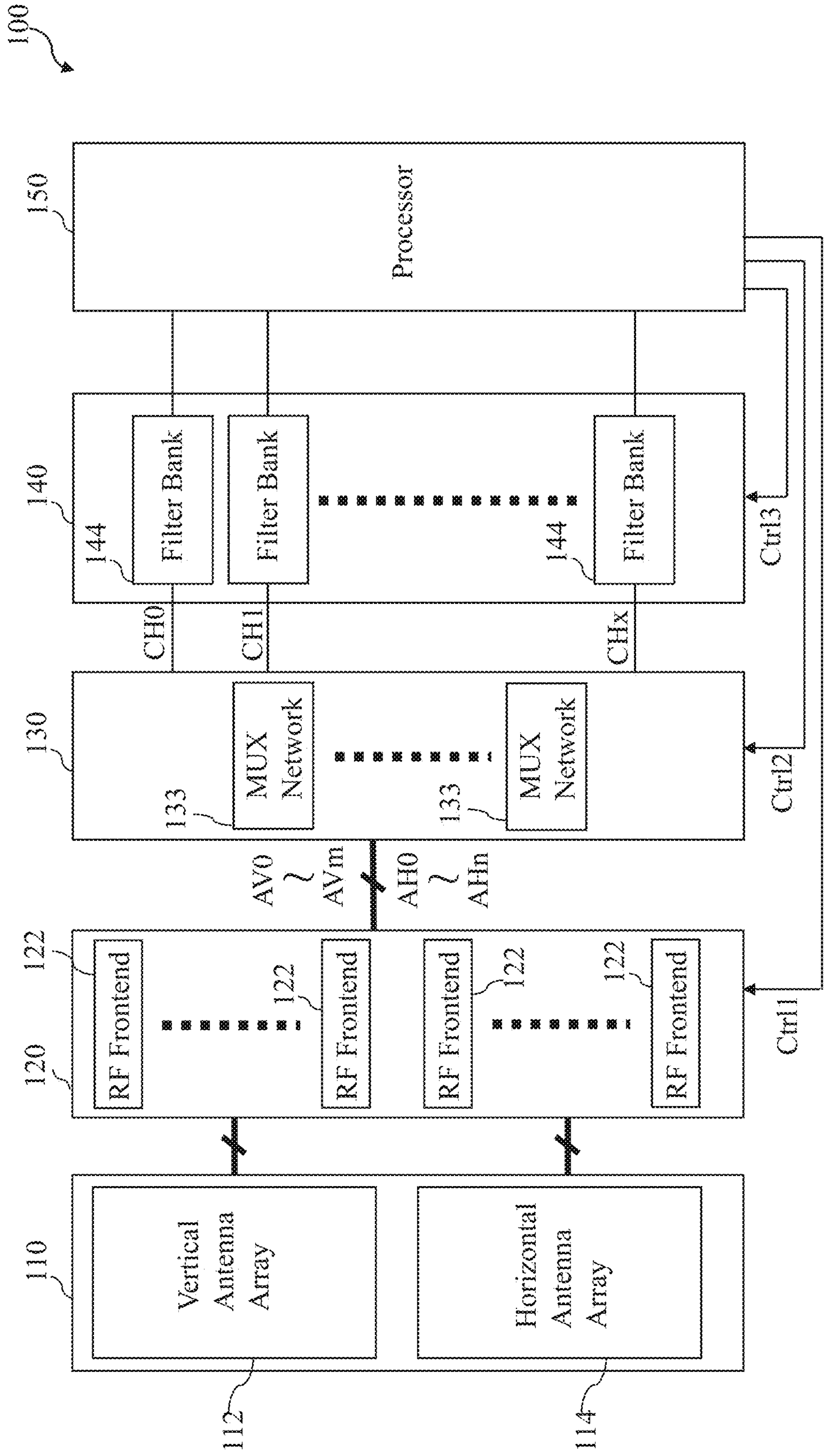
FIG. 1 is a diagram illustrating an exemplary radio frequency (RF) phased-array detector in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Further, it will be understood that when an element is referred to as being "connected to" or "coupled to" another element, it may be directly connected to or coupled to the other element, or intervening elements may be present. Some variations of the embodiments are described. Throughout the various views and illustrative embodiments, like reference numbers are used to designate like elements.

Drone services have become growingly popular in recent years because of their versatility and increasing affordability. On the other hand, owing to the increase in drone misuse or malicious drone activity, development of counter-drone technology has become essential. For example, the counter-drone technology may include a drone detection system that utilizes a radar array for drone tracking. However, the radar array is usually clunky and expensive, and is unable to detect autonomous drones.

The present disclosure describes exemplary phased-array detectors. The phased-array detector includes multiple vertical antennas and multiple horizontal antennas. By detecting the wireless signals received by the vertical antennas and the horizontal antennas, the phased-array detector is capable of determining location information (e.g., azimuth and elevation) of emitting sources that emit the wireless signals. Further description is provided below.

FIG. 1 is a diagram illustrating an exemplary radio frequency (RF) phased-array detector 100 in accordance with some embodiments of the present disclosure. The RF phased-array detector 100 is a sensor configured to detect location information of one or more radio-emitting sources in receiving (RX) mode. In addition, the RF phased-array detector 100 can serve as a transmitter that is configured to transmit an RF output signal according to the detected location information in transmitting (TX) mode. In some embodiments, the location information includes coordinates of the radio-emitting sources, e.g., the azimuth and the elevation of the radio-emitting sources. In some embodiments, the radio-emitting source is an electronic device (e.g., a drone or a drone remote) capable of providing a signal that can be a WiFi signal or within a UHF band or other frequency ranges. In some embodiments, the signal may be a wireless remote control signal.

The RF phased-array detector 100 includes an antenna module 110, a frontend module 120, a multiplexer (MUX) module 130, a filter module 140 and a processor 150. The antenna module 110 includes a vertical antenna array 112 and a horizontal antenna array 114. The vertical antenna array 112 is formed by a plurality of vertical antennas (not shown), and the horizontal antenna array 114 is formed by a plurality of horizontal antennas (not shown). The vertical antenna array 112 is a linear array of phased-array antennas, and the horizontal antenna array 114 is a planar array of phased-array antennas. In some embodiments, the vertical antennas are Dipole antennas, and the horizontal antennas are Vivaldi antennas. In some embodiments, each vertical antenna is an omnidirectional antenna, or an antenna having an omnidirectional antenna pattern. In some embodiments, each horizontal antenna is a directional antenna, or an antenna having a directional antenna pattern.

The frontend module 120 is coupled between the antenna module 110 and the multiplexer module 130. The frontend module 120 includes a plurality of RF frontends 122, and each RF frontend 122 is coupled to an individual vertical antenna of the vertical antenna array 112 or an individual horizontal antenna of the horizontal antenna array 114. In other words, the number of RF frontends is equal to the sum of the number of horizontal antennas and the number of vertical antennas. In some embodiments, the number of vertical antennas is less than the number of horizontal antennas. In response to the control signal Ctrl1 sent from the processor 150, each RF frontend 122 is configured to receive a wireless signal from a corresponding antenna of the antenna module 110 in RX mode, or provide an output signal to the corresponding antenna of the antenna module 110 in TX mode. For example, in RX mode, a portion of the RF frontends 122 are used to receive the wireless signals from the antennas of the vertical antenna array 112 and to provide the input signals AV0 through AVm, and the remaining RF frontends 122 are used to receive the wireless signals from the antennas of the horizontal antenna array 114 and to provide the input signals AH0 through AHn.

The multiplexer module 130 is coupled between the frontend module 120 and the filter module 140, and the multiplexer module 130 includes a plurality of MUX networks 133. The filter module 140 is coupled between the multiplexer module 130 and the processor 150, and the filter module 140 includes a plurality of filter banks 144 corresponding to channels CH0 through CHx. According to the control signal Ctrl2 from the processor 150, the MUX networks 133 are configured to provide the input signals outputted from the frontend module 120 to the corresponding filter banks 144 in RX mode, or provide the output signals from the filter banks 144 to the corresponding RF frontends 122 in TX mode. Each filter bank 144 is configured to filter the signal in the corresponding channel according to the control signal Ctrl3 from the processor 150 in RX and TX modes.

The processor 150 may be implemented in a Field Programmable Gate Array (FPGA) device, a System on a Chip (SoC) device or multiple integrated circuits (ICs). The processor 150 includes a plurality of channels for transmitting and receiving the signals. Each TX channel is configured to provide a digital to analog converter (DAC) output as the output signal in TX mode, and each RX channel is configured to receive the wireless signal as an analog to digital converter (ADC) input in RX mode. In some embodiments, I/Q phase shifters are implemented in the processor 150; in other words, no mixer and related circuits are implemented in the frontend module 120. The components of the RF phased-array detector 100 are further described below.

Figure 2:
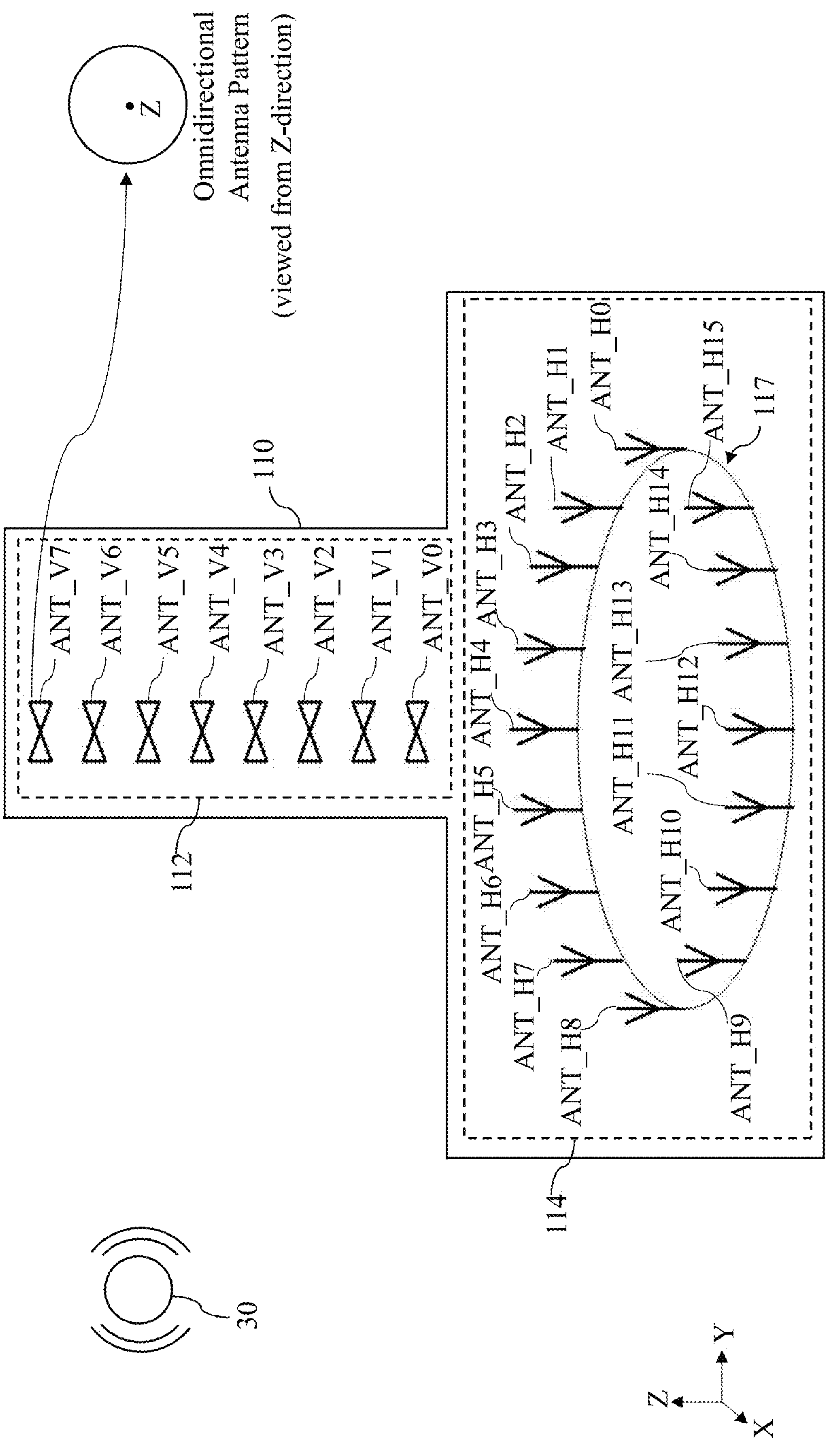
FIG. 2 is a diagram illustrating the antenna module of FIG. 1 in accordance with some embodiments of the present disclosure.

FIG. 2 is a diagram illustrating the antenna module 110 of FIG. 1 in accordance with some embodiments of the present disclosure. The antenna module 110 includes the vertical antenna array 112 and the horizontal antenna array 114. The RF phased-array detector 100 is configured to detect location information (e.g., azimuth and elevation) of one or more radio-emitting sources 30 through the antenna module 110. The vertical antenna array 112 includes the vertical antennas ANT_V0 through ANT_V7. The vertical antennas ANT_V0 through ANT_V7 are arranged along a straight line extending in Z-direction, i.e., a vertical line. Each of the vertical antennas ANT_V0 through ANT_V7 has an omnidirectional antenna pattern, and maximum directivity of each vertical antenna is pointing outward horizontally. In some embodiments, the vertical antenna is a broadband antenna. In some embodiments, the vertical antenna is a wideband dipole antenna with vertical polarization.

The horizontal antenna array 114 includes the horizontal antennas ANT_H0 through ANT_H15. The horizontal antennas ANT_H0 through ANT_H15 are arranged on a plane non-parallel to the straight line. For example, the plane is an XY plane perpendicular to Z-direction, or referred to as a horizontal plane. Each horizontal antenna has a directional antenna pattern. In some embodiments, the horizontal antenna is a broadband antenna. In some embodiments, the horizontal antenna has a wide horizontal beam width. In the present embodiment, the number of antennas in the horizontal antenna array 114 is twice the number of antennas in the vertical antenna array 112.

In the example of FIG. 2, the horizontal antennas ANT_H0 through ANT_H15 are arranged in a circle 117 of the plane, and each horizontal antenna has a uniform antenna pattern symmetrical to a center of the circle 117. In addition, respective antenna patterns of the horizontal antennas ANT_H0 through ANT_H15 are symmetric about the center of the circle 117. In some embodiments, the horizontal antennas ANT_H0 through ANT_H15 may be arranged in other types of symmetrical shapes on the plane. Furthermore, the straight line, along which the vertical antennas ANT_V0 through ANT_V7 are arranged, is perpendicular to the plane and passes through the center of the circle 117. In the embodiment, the vertical antennas ANT_V0 through ANT_V7 are disposed over the circle 117 formed by the horizontal antennas ANT_H0 through ANT_H15. In some embodiments, the vertical antennas ANT_V0 through ANT_V7 are disposed under the circle 117. In some embodiments, a portion of the vertical antennas ANT_V0 through ANT_V7 are disposed over the circle 117, and the remaining vertical antennas are disposed under the circle 117. For example, the vertical antennas ANT_V4 through ANT_V7 are disposed over the circle 117, and the vertical antennas ANT_V0 through ANT_V3 are disposed under the circle 117. In some embodiments, each horizontal antenna is a Vivaldi antenna with vertical polarization, which is wideband and directional outward the circle 117.

Figure 3A:
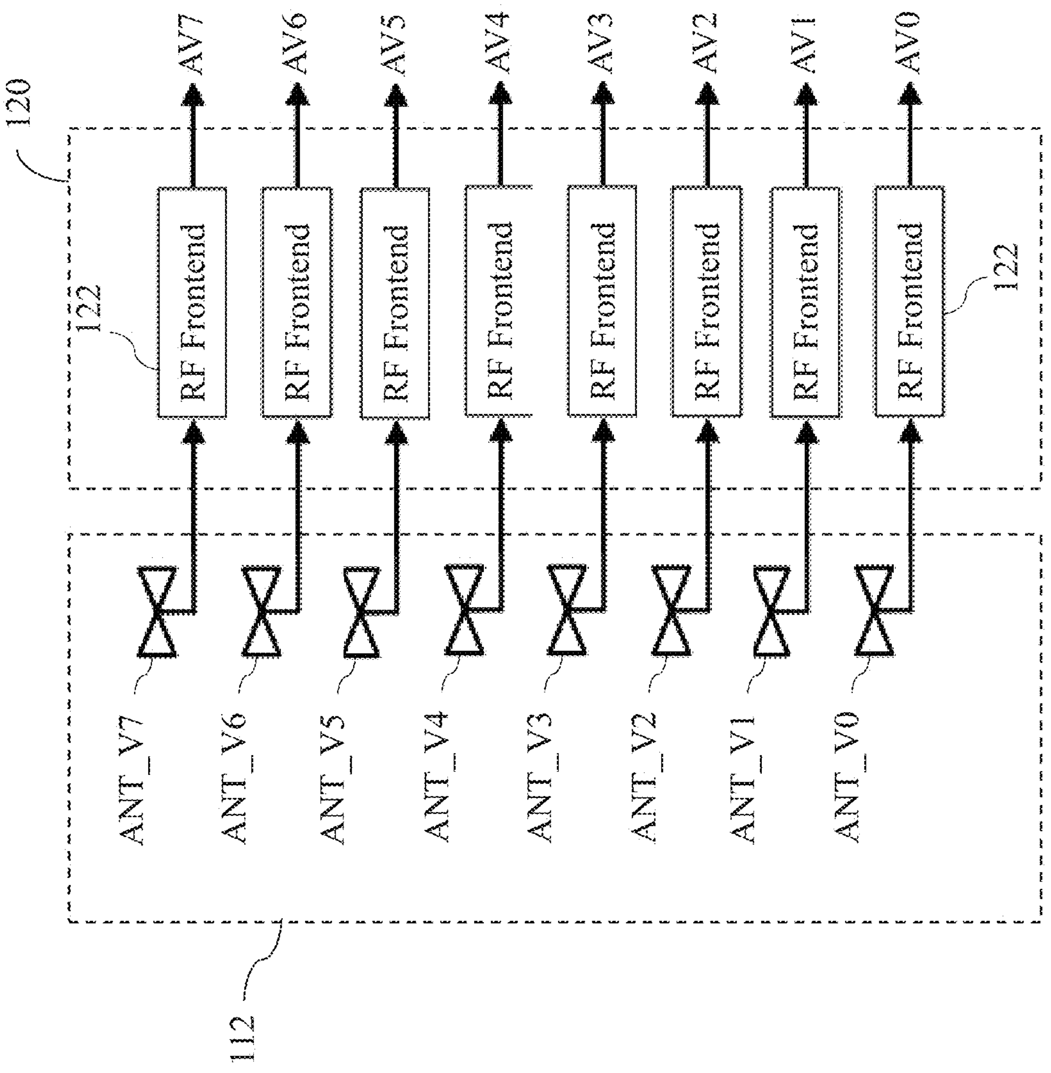
FIG. 3A illustrates an exemplary connection between the vertical antennas of vertical antenna array and the RF frontends of the frontend module in accordance with some embodiments of the present disclosure.

FIG. 3A is a diagram illustrating an exemplary connection between the vertical antenna array 112 and the frontend module 120 shown in FIG. 1 in accordance with some embodiments of the present disclosure. In the present embodiment, the vertical antenna array 112 is implemented using the vertical antennas ANT_V0 through ANT_V7 shown in FIG. 2. For illustrative purposes, the connection between the vertical antenna array 112 and the frontend module 120 is described with reference to an operating scenario in which each vertical antenna is used as a receiver antenna. Those skilled in the art can appreciate that the connection shown in FIG. 3A can be employed in an operating scenario, in which each vertical antenna is used as a transmitter antenna, without departing from the scope of the present disclosure.

The vertical antennas ANT_V0 through ANT_V7 are coupled to the RF Frontends 122 respectively, and are arranged to provide the input signals AV0 through AV7, respectively. Taking the vertical antenna ANT_V7 as an example to illustrate, the vertical antenna ANT_V7 is arranged to receive a radio wave and accordingly provide an input signal to the corresponding RF frontend 122, which is configured to process the wireless signal at the original incoming frequency to thereby provide the input signal AV7 to the MUX module 130.

Figure 3B:
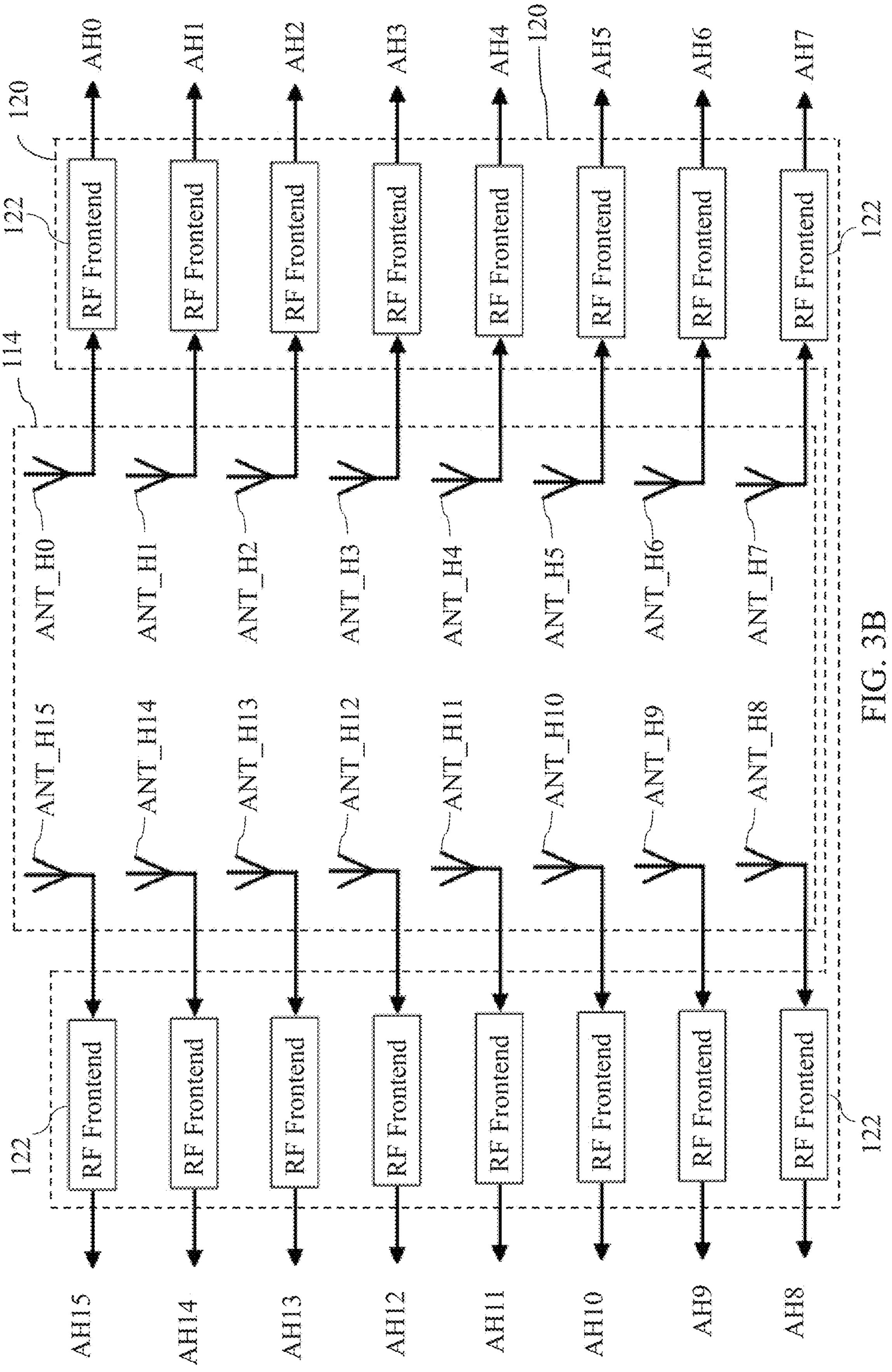
FIG. 3B illustrates an exemplary connection between the horizontal antennas of horizontal antenna array and the RF frontends of the frontend module in accordance with some embodiments of the present disclosure.

FIG. 3B is a diagram illustrating an exemplary connection between the horizontal antenna array 114 and the frontend module 120 shown in FIG. 1 in accordance with some embodiments of the present disclosure. In the present embodiment, the horizontal antenna array 114 is implemented using the horizontal antennas ANT_H0 through ANT_H15 shown in FIG. 2. For illustrative purposes, the connection between the horizontal antenna array 114 and the frontend module 120 is described with reference to an operating scenario in which each horizontal antenna is used as a receiver antenna. Those skilled in the art can appreciate that the connection shown in FIG. 3B can be employed in an operating scenario in which each horizontal antenna is used as a transmitter antenna, without departing from the scope of the present disclosure.

The horizontal antennas ANT_H0 through ANT_H15 are coupled to the RF Frontends 122 respectively, and are arranged to provide the input signals AH0 through AH15, respectively. Taking the horizontal antenna ANT_H8 as an example to illustrate, the horizontal antenna ANT_H8 is arranged to receive a radio wave and accordingly provide an input signal to the corresponding RF frontend 122, which is configured to process the wireless signal at the original incoming frequency to thereby provide the input signal AH8 to the MUX module 130. In the embodiment shown in FIG. 3B, the linearly arranged horizontal antennas ANT_H0 through ANT_H7 and the linearly arranged horizontal antennas ANT_H8 through ANT_H15 are provided only to illustrate the connection between the horizontal antennas and the RF frontends. As described above, the horizontal antennas ANT_H0 through ANT_H15 are physically arranged in the circle 117 of the plane of FIG. 2.

In the embodiments shown in FIGS. 3A and 3B, the antenna module 110 has eight vertical antennas in the vertical antenna array 112 and sixteen horizontal antennas in the horizontal antenna array 114. Furthermore, the frontend module 120 has twenty four RF frontends 122. In other words, the number of horizontal antennas is twice the number of vertical antennas, and the number of RF frontends 122 is equal to the sum of the number of horizontal antennas and the number of vertical antennas.

In some embodiments, the RF frontends 122 of the frontend module 120 have the same circuit configuration and design. The RF frontend 122 is capable of providing a wideband low noise path for the input signal in RX mode. Moreover, the RF frontend 122 is capable of providing respective programmable gain paths for the signal in RX and TX modes. For example, the RF frontend 122 is configured to perform a programmable gain function to attenuate the input signal when large jamming signals are detected by the RF phased-array detector 100 in RX mode.

Figure 4A:
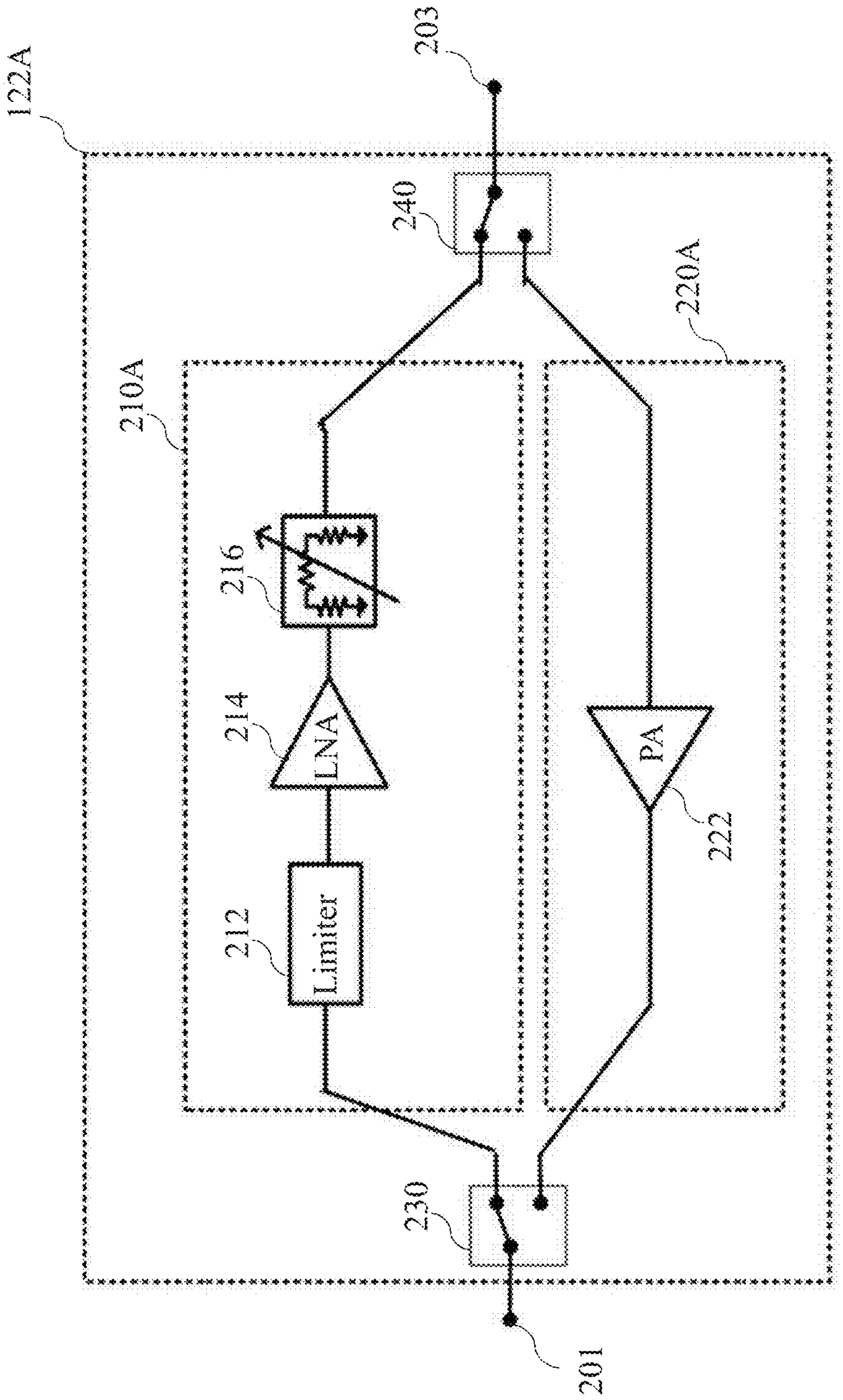
FIGS. 4A through 4C illustrate implementations of the RF frontend of FIG. 1 in accordance with some embodiments of the present disclosure.

FIG. 4A is a diagram illustrating an exemplary RF frontend of FIG. 1 in accordance with some embodiments of the present disclosure. In the present embodiment, the RF frontend 122A of FIG. 4A has the input/output (I/O) terminals 201 and 203. The RF frontend 122A is coupled to the corresponding vertical or horizontal antenna of the antenna module 110 shown in FIG. 1 through the I/O terminal 201. In addition, the RF frontend 122A is coupled to the MUX module 130 shown in FIG. 1 through the I/O terminal 203. The RF frontend 122A includes a receiving block 210A, a transmitting block 220A and the switching units 230 and 240. The components (or devices) in the RF frontend 122A are controlled by the control signal Ctrl1 of FIG. 1. The operation associated with the control signal Ctrl1 are not shown in FIG. 4A for the sake of simplicity.

In the embodiment, each of the switching units 230 and 240 is a single pole double throw (SPDT) switch, which has a single input and can connect to and switch between two outputs. In the RF frontend 122A, the switching units 230 and 240 are synchronously controlled to connect the receiving block 210A or the transmitting block 220A. When the RF frontend 122A is configured to receive an input signal from a vertical/horizontal antenna in RX mode, the switching unit 230 is controlled to connect the I/O terminal 201 to the receiving block 210A, and the switching unit 240 is controlled to connect the I/O terminal 203 to the receiving block 210A. When the RF frontend 122A is configured to output an output signal to a vertical/horizontal antenna in TX mode, the switching unit 230 is controlled to connect the I/O terminal 201 to the transmitting block 220A, and the switching unit 240 is controlled to connect the I/O terminal 203 to the transmitting block 220A.

The receiving block 210A includes a limiter 212, a low noise amplifier (LNA) 214, and a digital-step attenuator (DSA) 216 that form an RX path for the input signal. The LNA 214 is coupled between the limiter 212 and the DSA 216 in the RX path. The transmitting block 220A includes a power amplifier (PA) 222 that formed a TX path for the output signal. In the receiving block 210A and the transmitting block 220A, the gain, frequency range and the 1 dB compression point (P1dB) of each device (or component) are determined according to various applications.

Figure 4B:
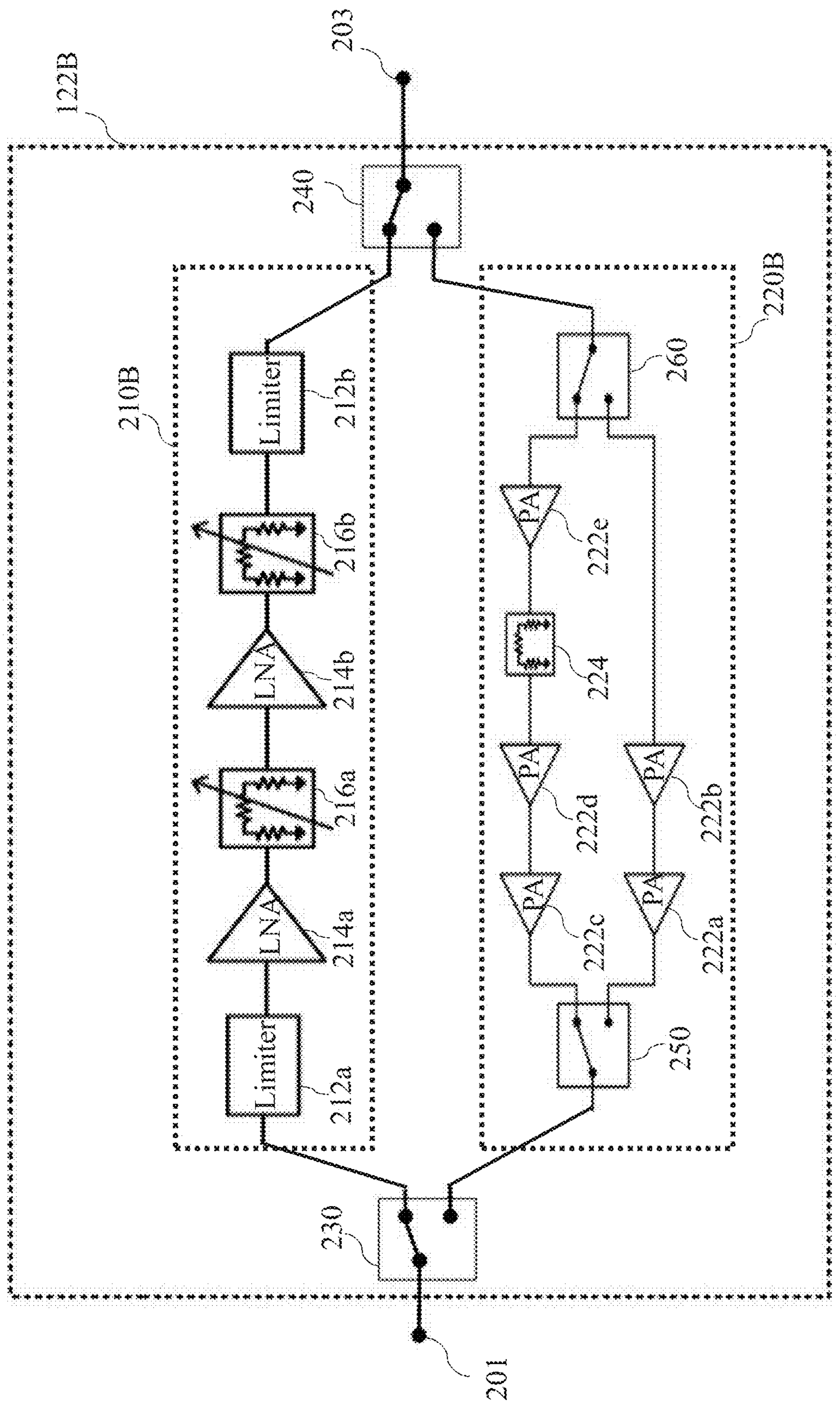

FIG. 4B is a diagram illustrating an exemplary RF frontend of FIG. 1 in accordance with some embodiments of the present disclosure. The RF frontend 122B of FIG. 4B has the I/O terminals 201 and 203. The RF frontend 122B includes a receiving block 210B, a transmitting block 220B and the switching units 230 and 240. The components (or devices) in the RF frontend 122B are controlled by the control signal Ctrl1 of FIG. 1. The operation associated with the control signal Ctrl1 are not shown in FIG. 4B for the sake of simplicity. Moreover, the switching operations of the switching units 230 and 240 are the same as that in the RF frontend 122A of FIG. 4A.

The receiving block 210B includes the limiters 212*a* and 212*b*, the LNAs 214*a* and 214*b*, and the DSAs 216*a* and 216*b* that formed an RX path for the input signal. In the RX path, the LNA 214*a* is coupled between the limiter 212*a* and the DSA 216*a*, the DSA 216*b* is coupled between the LNA 214*b* and the limiter 212*b*, and the LNA 214*b* is coupled between the DSAs 216*a* and 216*b*.

The transmitting block 220B includes the switching units 250 and 260, the PAs 222*a* through 222*e* and the attenuator 224. The PAs 222*a* and 222*b*, coupled in series between the switching units 250 and 260, form a first TX path for the output signal in TX mode. The PA 222*c*, the PA 222*d*, the attenuator 224 and the PA 222*e* are coupled in series between the switching units 250 and 260, and form a second TX path for the output signal. In the receiving block 210B and the transmitting block 220B, the gain, frequency range and the 1 dB compression point (P1dB) of each device (or component) are determined according to various applications. Furthermore, the arrangement of the devices (or components) in the RX path, the first TX path or the second TX path can be adjusted according to various applications. In the transmitting block 220B, the switching units 250 and 260 are the SPDT switches. The switching units 250 and 260 are synchronously controlled so as to selectively connect the first or second TX path to the switching units 230 and 240. The first and second TX paths are configured to provide the different gains and/or frequency ranges for the output signal in TX mode.

Figure 4C:
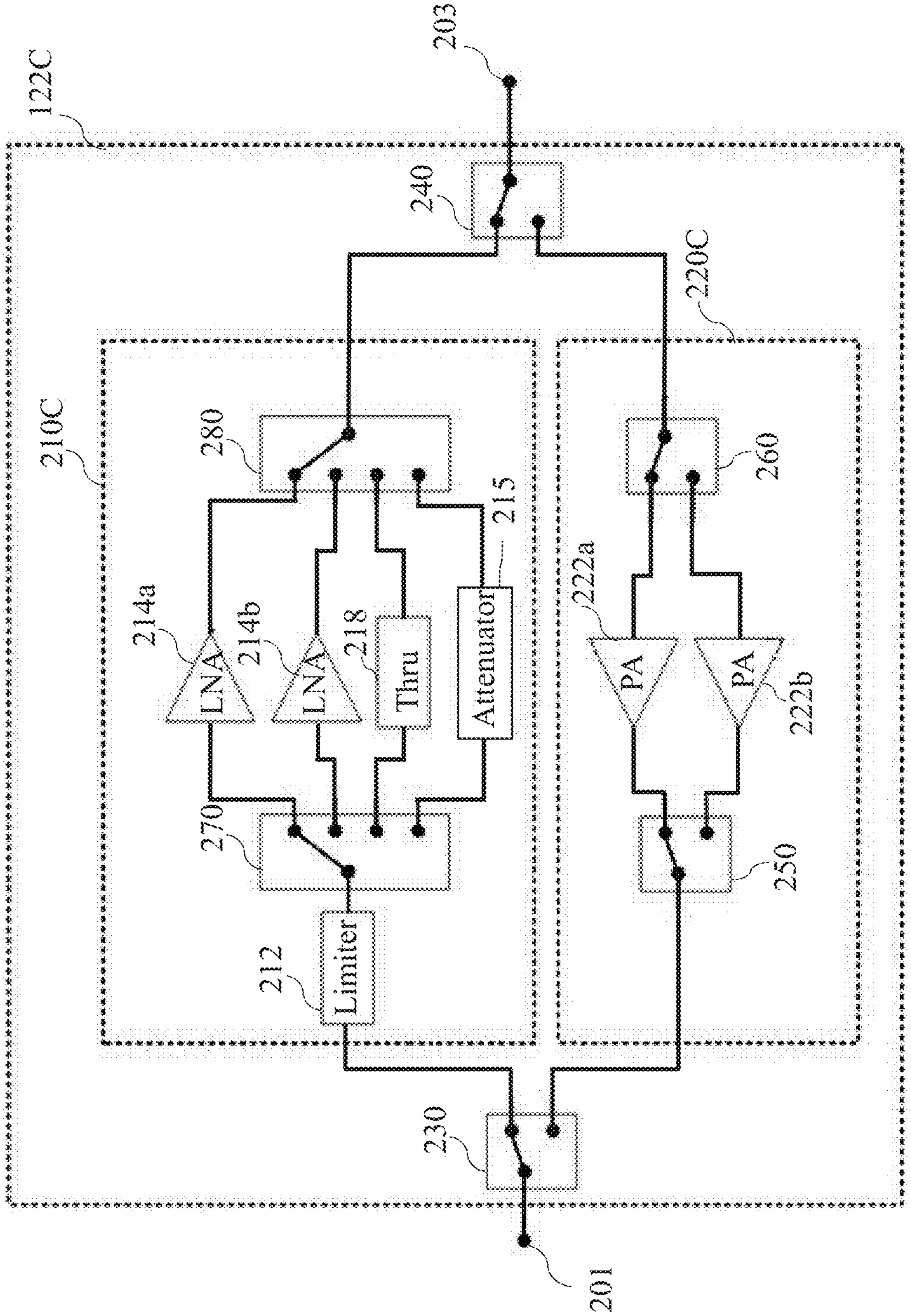

FIG. 4C is a diagram illustrating an exemplary RF frontend of FIG. 1 in accordance with some embodiments of the present disclosure. The RF frontend 122C of FIG. 4C has the I/O terminals 201 and 203. The RF frontend 122C includes a receiving block 210C, a transmitting block 220C and the switching units 230 and 240. The components (or devices) in the RF frontend 122C are controlled by the control signal Ctrl1 of FIG. 1. The operation associated with the control signal Ctrl1 are not shown in FIG. 4C for the sake of simplicity. Moreover, the switching operations of the switching units 230 and 240 are the same as that in the RF frontend 122A of FIG. 4A.

The receiving block 210C includes the limiter 212, the switching units 270 and 280, the LNAs 214*a* and 214*b*, the attenuator 215, and the thru-line (or 0dB attenuator) 218. The limiter 212 is coupled between the switching units 230 and 270. Each of the switching units 270 and 280 is a single pole four throw (SP4T) switch, which has a single input and can connect to and switch between four outputs. In the RF frontend 122C, the switching units 270 and 280 are synchronously controlled to selectively connect the LNA 214*a* in a first RX path, the LNA 214*b* in a second RX path, the thru-line 218 in a third RX path or the attenuator 215 in a fourth RX path to the limiter 212 and the switching unit 240. The first through fourth RX paths are configured to provide the different gains and/or frequency ranges for the input signal in RX mode. Furthermore, the number and type of devices in the first through fourth RX paths are determined according to various applications.

The transmitting block 220C includes the switching units 250 and 260, and the PAs 222*a* and 222*b*. The switching units 250 and 260 are synchronously controlled.to selectively connect the PA 222*a* in a first TX path or the PA 222*b* in a second TX path to the switching units 230 and 240. The first and second TX paths are configured to provide the different gains and/or frequency ranges for the output signal in TX mode. Furthermore, the number and type of devices in the first and second TX paths are determined according to various applications.

FIG. 5 is a table illustrating selected input signals corresponding to different channels in different modes of operation in accordance with some embodiments of the present disclosure. Referring to FIG. 5 and also to FIG. 1, the processor 150 is configured to control the MUX networks 133 of the MUX module 130 to receive the input signal in a single antenna mode or an omnidirectional mode for channels CH0 through CH7. For example, when receiving the input signal in the RX mode, each MUX network 133 is capable of selecting (or assigning/distributing) one input signal from one antenna in the single antenna mode, or selecting respective input signals from multiple antennas in the omnidirectional mode, to thereby provide an output signal to a corresponding channel through the individual filter bank 144.

In the single antenna mode, each MUX network 133 is configured to select the input signal from a single antenna (i.e., one of the horizontal antennas ANT_H0 through ANT_H15 or one of the vertical antennas ANT_V0 through ANT_V7) to the corresponding channel. For example, by controlling the switching units of the MUX network 133, the input signal AH0, AH8 or AV0 is assigned (i.e., selecting and providing) to the channel CH0, the input signal AH1, AH9 or AV1 is assigned to the channel CH1, and the input signal AH2, AH10 or AV2 is assigned to the channel CH2, and so on.

In some embodiments, the input signals AH0 through AH7 from the horizontal antennas ANT_H0 through ANT_H7 are assigned as a first set of input signals to be provided to the channels CH0 through CH7. In some embodiments, the input signals AH8 through AH15 from the horizontal antennas ANT_H8 through ANT_H15 are assigned as a second set of input signals to be provided to the channels CH0 through CH7. In some embodiments, the input signals AV0 through AV7 from the vertical antennas ANT_V0 through ANT_V7 are assigned as a third set of input signals to be provided to the channels CH0 through CH7. By dynamically selecting the first, second and third sets of the input signals, the processor 150 is configured to determine the location information of the radio-emitting source according to the beamforming of the selected input signals. For example, the azimuth of the radio-emitting source is determined according to the first and second sets of input signals, and the elevation of the radio-emitting source is determined according to the third set of input signals.

The antenna configuration in FIG. 5 is provided for illustration purposes, and not intended to limit the scope of the present disclosure. In some embodiments, the input signals selected from eight of the 16 horizontal antennas ANT_H0 through ANT_H15 are assigned to the channels CH0 through CH7 first, and then the input signals from the remaining 8 horizontal antennas are assigned to the channels CH0 through CH7.

In the omnidirectional mode, each MUX network 133 is configured to combine (or sum) the input signals from four of the 16 horizontal antennas ANT_H0 through ANT_H15 with weighted power to the corresponding channel. In the embodiment, the weighted power sum of the input signals AH0, AH4, AH8 and AH12 are assigned to the channels CH0 and CH4. As shown in the horizontal antenna array 114 of FIG. 2, the horizontal antennas ANT_H0, ANT_H4, ANT_H8 and ANT_H12 are pointing to four direction symmetrically to the center of the circle 117, and the power sum of the input signals AH, AH4, AH8 and AH12 is approximately an omnidirectional antenna pattern. Similarly, the weighted power sum of the input signals AH1, AH5, AH9 and AH13 are assigned to the channels CH1 and CH5. The weighted power sum of the input signals AH2, AH6, AH10 and AH14 are assigned to the channels CH2 and CH6. The weighted power sum of the input signals AH3, AH7, AH11 and AH15 are assigned to the channels CH3 and CH7.

Figure 6:
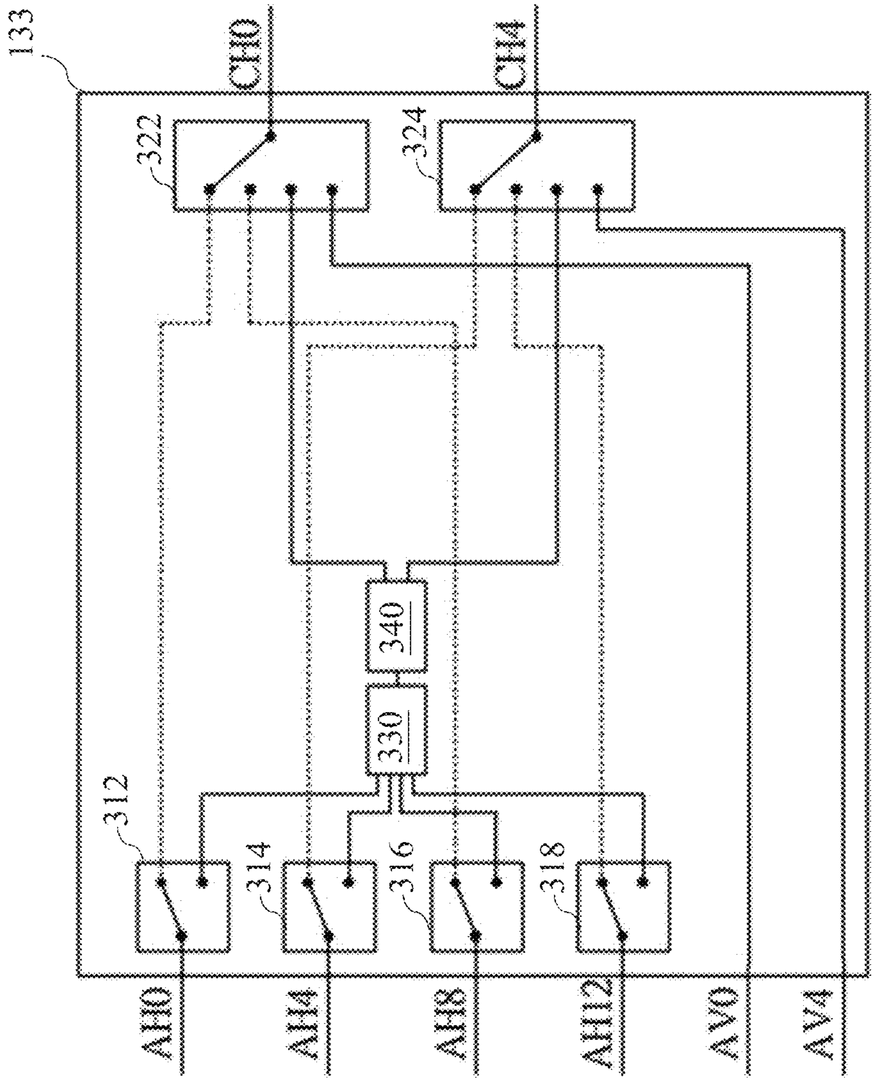
FIG. 6 is a diagram illustrating an exemplary MUX network of FIG. 1 in accordance with some embodiments of the present disclosure.

FIG. 6 is a diagram illustrating an exemplary MUX network 133 of FIG. 1 in accordance with some embodiments of the present disclosure. In the present embodiment, the MUX network 133 of FIG. 6 is used to select and provide the input signals to the channels CH0 and CH4 in the single antenna mode or the omnidirectional mode described in FIG. 5. The MUX network 133 includes the switching units 312, 314, 316 and 318, a power combiner 330, a power divider 340, and the switching units 322 and 324. The components (or devices) in the MUX network 133 are controlled by the control signal Ctrl2 of FIG. 1. The operation associated with the control signal Ctrl2 are not shown in FIG. 6 for the sake of simplicity.

In the MUX network 133, the switching units 312, 314, 316 and 318 are the SPDT switches, and the switching units 322 and 324 are the SP4T switches. The switching units 312 and 316 are controlled to selectively provide the input signals AH0 and AH8 to the switching unit 322 or the power combiner 330. The switching units 314 and 318 are controlled to selectively provide the input signals AH4 and AH12 to the switching unit 324 or the power combiner 330. The power combiner 330 is configured to combine the input signals AH0, AH4, AH8 and AH12 with the same or different weights, and the power divider 340 is configured to match and provide the combined input signal to the switching units 322 and 324. In the present embodiment, the switching unit 322 is controlled to selectively provide the input signal AH0, the input signal AH8, the combined input signal or the input signal AV0 to the channel CH0. In the present embodiment, the switching unit 324 is controlled to selectively provide the input signal AH4, the input signal AH12, the combined input signal or the input signal AV4 to the channel CH4. Similarly, according to the arrangement of the single antenna mode or the omnidirectional mode in the table of FIG. 5, the MUX network 133 shown in FIG. 6 can be used to select and provide the corresponding input signals to the channels CH1 and CH5, the channels CH2 and CH6, or the channels CH3 and CH7.

Figure 7A:
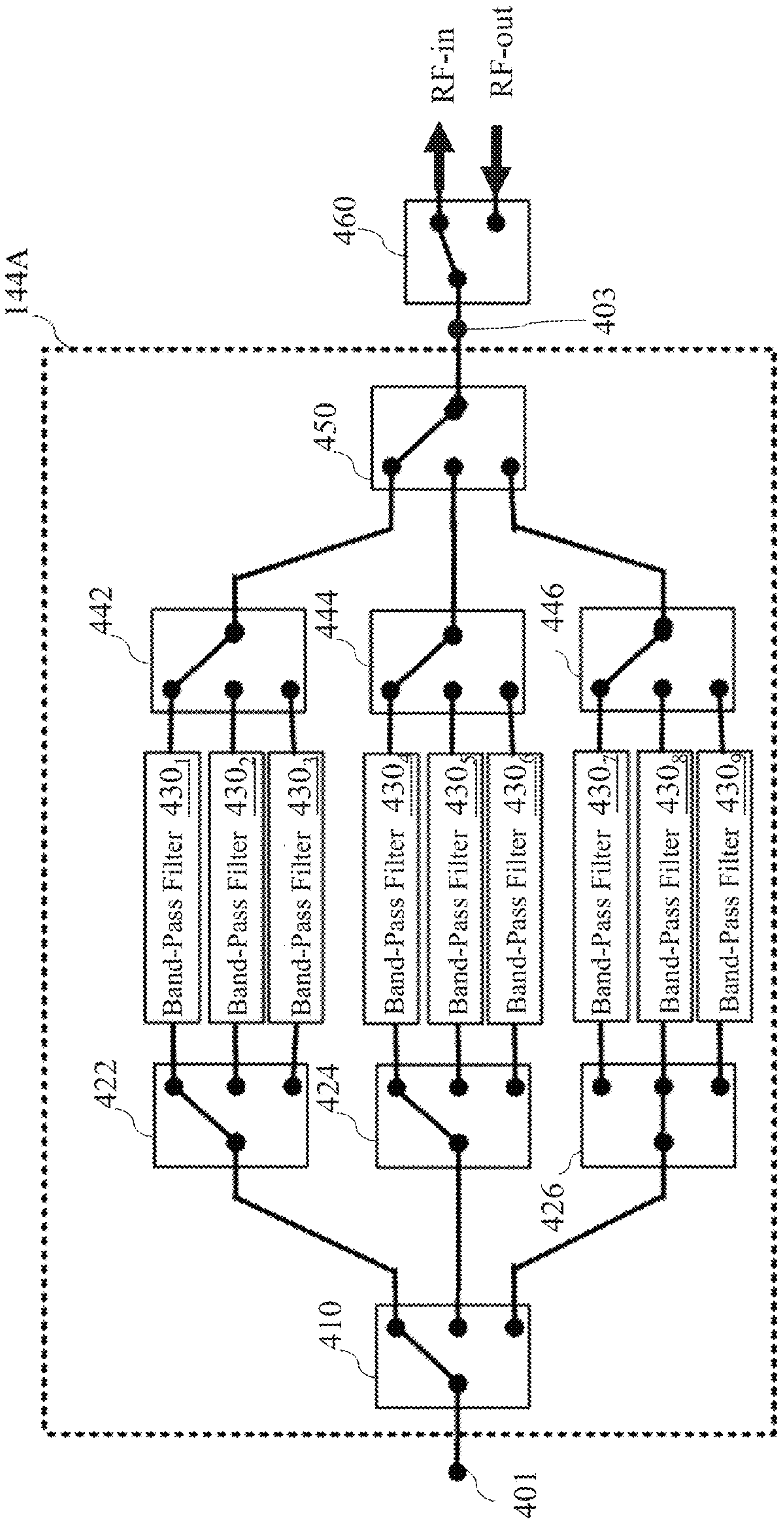
FIGS. 7A and 7B illustrate implementations of the filter bank of FIG. 1 in accordance with some embodiments of the present disclosure.

FIG. 7A is a diagram illustrating an exemplary filter bank of FIG. 1 in accordance with some embodiments of the present disclosure. In the present embodiment, the filter bank 144A has the I/O terminals 401 and 403. The filter bank 144A is coupled to the corresponding MUX network through the I/O terminal 401, and the filter bank 144A is coupled to a switching unit 460 through the I/O terminal 403. The switching unit 460 is configured to provide the input signal filtered by the filter bank 144A to a corresponding channel in RX mode, or to provide the output signal from the corresponding channel to the filter bank 144A in TX mode.

The filter bank 144A includes the switching units 410, 422 through 426, 442 through 446 and 450, and the band-pass filters $\mathbf{430}_1$ through $\mathbf{430}_9$. The switching units 410, 422 through 426, 442 through 446 and 450 are single pole multiple throw switches that depends on the number of band-pass filters in the filter bank. In the filter bank 144A, the switching units 410, 422 through 426, 442 through 446 and 450 are the single pole triple throw (SP3T) switches. The components (or devices) in the filter bank 144A are controlled by the control signal Ctrl3 of FIG. 1. The operation associated with the control signal Ctrl3 are not shown in FIG. 7A for the sake of simplicity.

In the filter bank 144A, by switching the switching units 410, 422 through 426, 442 through 446 and 450, only one of the band-pass filters $\mathbf{430}_1$ through $\mathbf{430}_9$ is coupled to the I/O terminals 401 and 403. For example, as shown in FIG. 7A, the band-pass filter $\mathbf{430}_1$ is connected between the I/O terminals 401 and 403. Furthermore, the band-pass filters $\mathbf{430}_1$ through $\mathbf{430}_9$ have individual frequency bands (passbands), and the frequency bands of the band-pass filters $\mathbf{430}_1$ through $\mathbf{430}_9$ cover frequencies below 6G Hz. In some embodiment, the frequency bands of the band-pass filters $\mathbf{430}_1$ through $\mathbf{430}_9$ may partially overlap.

Figure 7B:
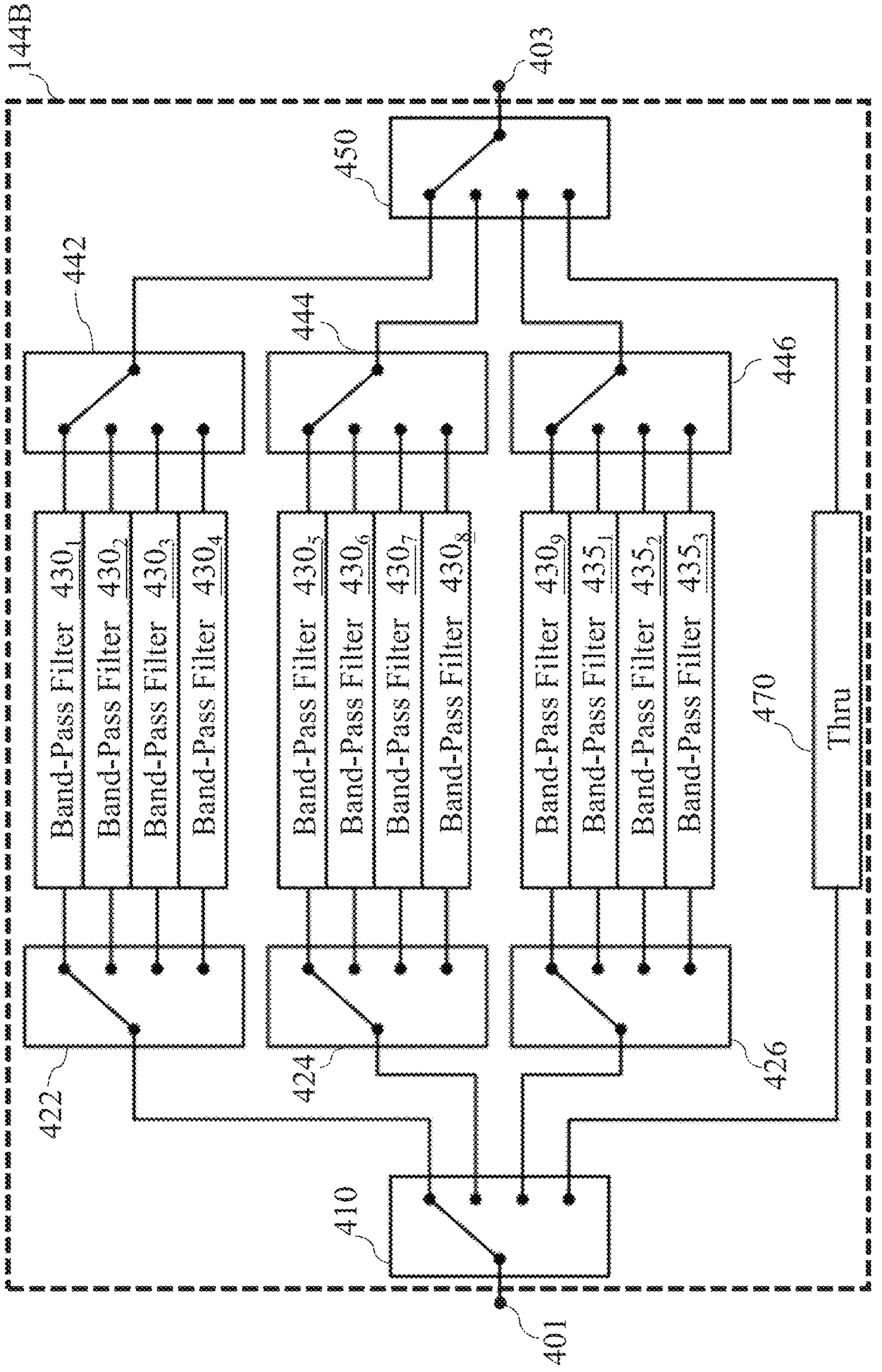

FIG. 7B is a diagram illustrating an exemplary filter bank of FIG. 1 in accordance with some embodiments of the present disclosure. In the present embodiment, the filter bank 144B of FIG. 7B has the I/O terminals 401 and 403. The filter bank 144B includes the switching units 410, 422 through 426, 442 through 446 and 450, the band-pass filters $\mathbf{430}_1$ through $\mathbf{430}_9$, the band-pass filters $\mathbf{435}_1$ through $\mathbf{435}_3$, and a thru-line 470. In the filter bank 144B, the switching units 410, 422 through 426, 442 through 446 and 450 are the SP4T switches. The thru-line 470 is configured to provide a bypass path for the input signal, e.g., the filter bank 144B does not filter the input signal when the thru-line 470 is coupled to the I/O terminals 401 and 403. The components (or devices) in the filter bank 144B are controlled by the control signal Ctrl3 of FIG. 1. The operation associated with the control signal Ctrl3 are not shown in FIG. 7B for the sake of simplicity.

In the filter bank 144B, by switching the switching units 410, 422 through 426, 442 through 446 and 450, only one of the band-pass filters $\mathbf{430}_1$ through $\mathbf{430}_9$ or the thru-line 470 is coupled to the I/O terminals 401 and 403. For example, as shown in FIG. 7B, the band-pass filter $\mathbf{430}_1$ is connected between the I/O terminals 401 and 403. As described above, the band-pass filters $\mathbf{430}_1$ through $\mathbf{430}_9$ have individual frequency bands, and the frequency bands of the band-pass filters $\mathbf{430}_1$ through $\mathbf{430}_9$ cover frequencies below 6G Hz.

Compared with the filter bank 144A of FIG. 7A, the filter bank 144B of FIG. 7B further includes the band-pass filters $435_1$ through $435_3$. The band-pass filters $435_1$ through $435_3$ have individual frequency bands, and the frequency bands of the band-pass filters $435_1$ through $435_3$ cover frequencies below 6G Hz. Each of the band-pass filters $435_1$ through $435_3$ has the frequency band overlapping the frequency bands of some of the band-pass filters $430_1$ through $430_9$. In other words, each frequency band of the band-pass filters $435_1$ through $435_3$ is wider than that of the band-pass filters $430_1$ through 430g.

Referring FIG. 8, FIG. 8 is a table illustrating frequency band relationship between the band-pass filters $430_1$ through $430_9$ and the band-pass filters $435_1$ through $435_3$ in accordance with some embodiments of the present disclosure. The band-pass filters $430_1$ through $430_9$ have the first frequency bands BD1 through BD9, respectively, and the first frequency band BD2 is higher than the first frequency band BD1, the first frequency band BD3 is higher than the first frequency band BD2, the first frequency band BD4 is higher than the first frequency band BD3, and so on. Similarly, the band-pass filters $435_1$ through $435_3$ have the second frequency bands WBD1 through WBD3, respectively, and the second frequency band WBD2 (e.g., 2000-4000 MHz) is higher than the second frequency band WBD1 (e.g., 100-2000 MHZ), and the second frequency band WBD3 (e.g., 4000-6000 MHz) is higher than the second frequency band WBD2.

In FIG. 8, the second frequency band WBD1 covers the first frequency bands BD1, BD2 and BD3, the second frequency band WBD2 covers the first frequency bands BD4, BD5 and BD6, and the second frequency band WBD3 covers the first frequency bands BD7, BD8 and BD9. In some embodiments, the second frequency band WBD1 covers the first frequency bands BD1, BD2 and BD3 and a small section of the first frequency band BD4. In some embodiments, the second frequency band WBD3 covers the first frequency bands BD7, BD8 and BD9 and a small section of the first frequency band BD6. In some embodiments, the second frequency band WBD2 covers the first frequency bands BD4, BD5 and BD6 and a small section of the first frequency bands BD3 and BD7.

Referring to FIG. 7B and FIG. 8 together, the filter bank 144B is configured to filter the input signal by using the band-pass filters $435_1$ through $435_3$ first in RX mode, so as to find the possible frequency range of the input signal from the second frequency bands WBD1 through WBD3. Next, the filter bank 144B is configured to filter the input signal by using the band-pass filters corresponding to the find second frequency band, thereby finding the correct frequency of the input signal from the first frequency bands corresponding to the find second frequency band.

For example, assuming that the input signal from the multiplexer module 130 shown in FIG. 1 is a 2.4G WiFi signal, the input signal is filtered by the band-pass filters 4351 through $435_3$ of the filter bank 144B, respectively. By measuring the filtered input signals from the band-pass filters $435_1$ through $435_3$ (e.g., obtaining the beamforming of the filtered input signals), the processor 150 is capable of detecting that the possible frequency of the input signal falls in the second frequency band WBD2. Next, the input signal is filtered by the band-pass filters 4304 through 4306 of the filter bank 144B, respectively. By measuring the input signals filtered by the band-pass filters 4304 through 4306, the processor 150 is capable of detecting that the correct frequency of the input signal. Therefore, by using the band-pass filters $435_1$ through $435_3$ having wider second frequency bands WBD1 through WBD3 first, the RF phased-array detector 100 can use fewer band-pass filters to detect the correct frequency of the input signal, thereby speeding up frequency detection and decreasing power consumption.

Figure 9:
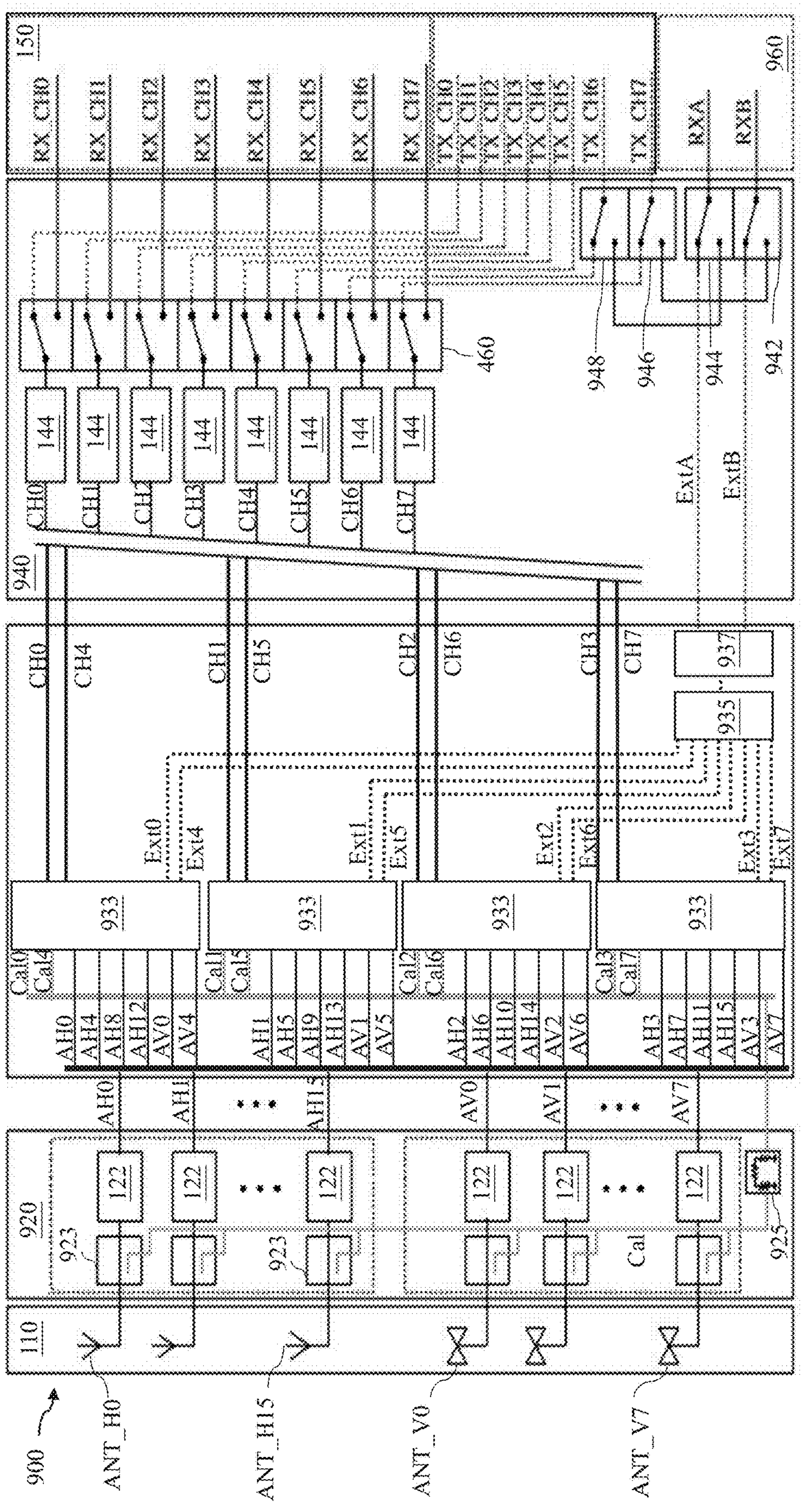
FIG. 9 is a diagram illustrating an RF phased-array detector in accordance with some embodiments of the present disclosure.

FIG. 9 is a diagram illustrating an RF phased-array detector 900 in accordance with some embodiments of the present disclosure. The RF phased-array detector 900 is configured to detect location information of one or more radio-emitting sources (e.g., the radio-emitting source 30 in FIG. 2). In the present embodiment, the RF phased-array detector 900 includes the antenna module 110, the frontend module 920, the MUX module 930, the filter module 940, the processor 150 and the extender 960. Similar to the RF phased-array detector 100 of FIG. 1, the RF phased-array detector 900 is capable of operating in a single antenna mode or an omnidirectional mode. Furthermore, the RF phased-array detector 900 is capable of further operating in a self-calibration mode, a bypass mode or a jamming mode. In order to simplify the description, the control signal Ctrl1, Ctrl2 and Ctrl3 are not shown in FIG. 9.

The antenna module 110 includes the vertical antennas ANT_V0 through ANT_V7 of the vertical antenna array 112 and the horizontal antennas ANT_H0 through ANT_H15 of the horizontal antenna array 114, and the arrangement of the vertical antenna array 112 and the horizontal antenna array 114 are described in FIG. 2.

In the frontend module 920, the RF frontends 122 are configured to receive the input signal from the corresponding antenna in RX mode or provide the output signal to the corresponding antenna in TX mode. Compared with the frontend module 120 of FIG. 1, the frontend module 920 further includes a plurality of couplers 923 and one or more attenuators 925. Each coupler 923 is coupled between the corresponding antenna and the corresponding RF frontend 122. The couplers 923 are configured to couple and combine the input signals from each antenna of the antenna module 110 to provide the calibration signal Cal to the attenuator 925 in RX mode. In the present embodiment, the attenuator 925 functions as a divider for providing the calibration signals Call through Cal7 to the MUX module 930.

The MUX module 930 includes the MUX networks 933, a power combiner 935 and a power divider 937. Similar to the MUX networks 133, the MUX networks 933 are configured to provide the input signals (e.g., the input signals AH0 through AH15 and AV0 through AV7) from the frontend module 120 to the corresponding filter banks 144 in RX mode or provide the output signals from the filter banks 144 to the corresponding RF frontends 122 in TX mode. Moreover, the MUX networks 933 are configured to further provide the calibration signals Call through Cal7 to the corresponding filter banks 144 in RX mode. Furthermore, the MUX networks 933 are configured to further provide the input signals AV0 through AV7 as the input signals Ext0 through Ext7 to the power combiner 935 in RX mode. The power combiner 935 is configured to combine the input signals Ext0 through Ext7, and the power divider 937 is configured to match and provide the combined input signals ExtA and ExtB to the filter module 940 in RX mode.

Figure 10:
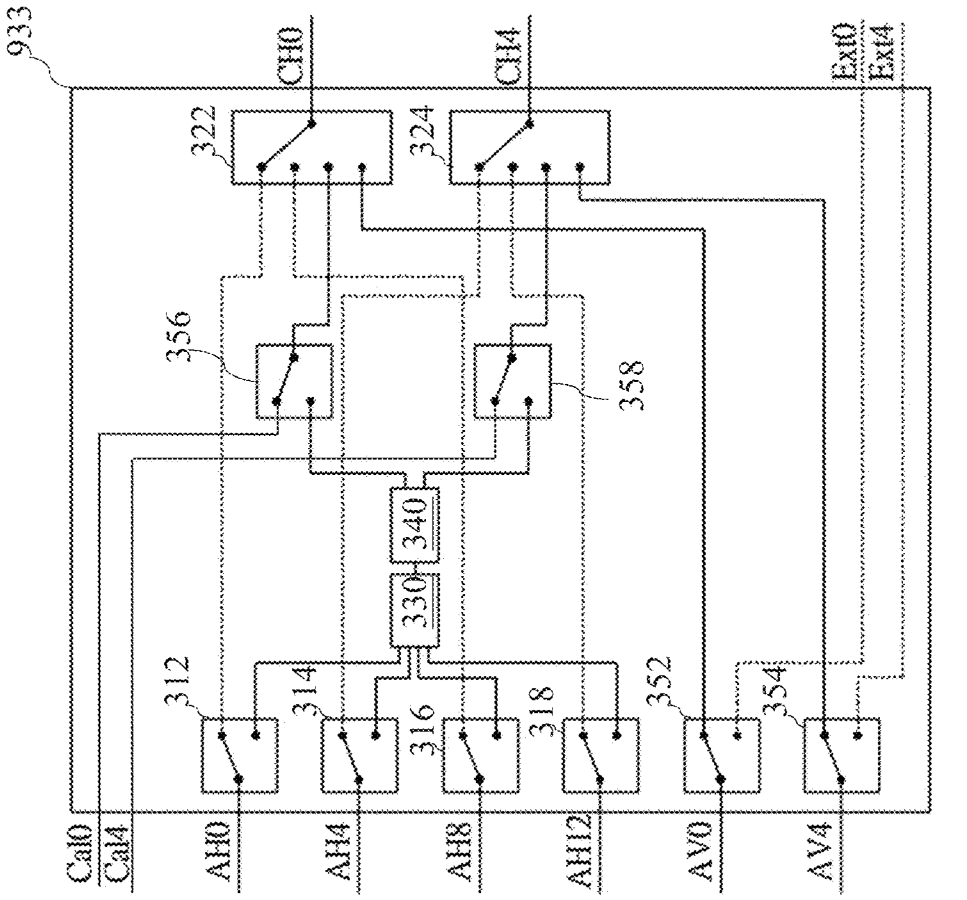
FIG. 10 is a diagram illustrating an exemplary MUX network of FIG. 9 in accordance with some embodiments of the present disclosure.

Referring to FIG. 10, FIG. 10 is a diagram illustrating an exemplary MUX network 933 of FIG. 9 in accordance with some embodiments of the present disclosure. Compared with the MUX network 133 of FIG. 6, the MUX network 933 further includes the switching units 352 through 358. The components (or devices) in the MUX network 933 are controlled by the control signal Ctrl2 of FIG. 1. The operation associated with the control signal Ctrl2 are not shown in FIG. 10 for the sake of simplicity.

In the MUX network 933, the switching units 352 through 358 are the SPDT switches. The switching unit 352 is controlled to selectively provide the input signal AV0 to the switching unit 322 or as the input signal Ext0. The switching unit 354 is controlled to selectively provide the input signal AV4 to the switching unit 324 or as the input signal Ext4. The switching unit 356 is controlled to selectively provide the calibration signal Call or the combined input signal from the power divider 340 to the switching unit 322. The switching unit 358 is controlled to selectively provide the calibration signal Cal4 or the combined input signal from the power divider 340 to the switching unit 324.

Referring back to FIG. 9, in the present embodiment, the filter module 940 includes the filter banks 144, the switching units 460, and the switching units 942 through 948. The switching units 460 are configured to provide the input signals filtered by the corresponding filter banks 144 to the receiving channels RX_CH0 through RX_CH7 of the processor 150, or to provide the output signals from the transmitting channels TX_CH0 through TX_CH7 of the processor 150 to the corresponding filter banks 144. The switching unit 946 is configured to provide the output signal of the transmitting channel TX-CH7 to the switching unit 942 or the corresponding switching unit 460. The switching unit 948 is configured to provide the output signal of the transmitting channel TX-CH6 to the switching unit 944 or the corresponding switching unit 460.

The switching unit 942 is configured to provide the combined input signal ExtB or the output signal of the transmitting channel TX-CH7 from the switching unit 946 to the channel RXB of the extender 960. The switching unit 944 is configured to provide the combined input signal ExtA or the output signal of the transmitting channel TX-CH6 from the switching unit 948 to the channel RXA of the extender 960. The extender 960 may be an additional detector for identifying the information (e.g., ID code of the drone) of radio-emitting sources according to the combined input signals ExtA and ExtB. In some embodiments, the extender 960 and the processor 150 are integrated in the same device.

FIG. 11 is a table illustrating selected input signals corresponding to different channels in different modes of operation in accordance with some embodiments of the present disclosure. Referring to FIG. 11 and also to FIG. 9, the processor 150 is configured to control the MUX networks 933 of the MUX module 930 to receive the input signal in the self-calibration mode, the bypass mode or the jamming mode for channels CH0 through CH7 and channels RXA and RXB. Similar to the MUX network 133 of the RF phased-array detector 100 in FIG. 1, each MUX network 933 of the MUX module 930 is capable of selecting (or assigning) the input signal from one antenna in a single antenna mode or the combined input signal from more antennas in an omnidirectional mode, to the corresponding channel through the individual filter bank 144, as shown in the table of FIG. 5. Furthermore, in the single antenna mode and the omnidirectional mode, the switching units 942 through 948 of the MUX module 940 are configured to provide the input signals from the transmitting channels TX_CH6 and TX_CH7 to the channels RXA and RXB, respectively.

In the self-calibration mode, the MUX network 933 is configured to select one of the input signals, one of the calibration signals or the combined input signal to the corresponding channel. For example, the input signals AH0, AH8 or AV0, the calibration signal Call or the weighted power sum of the input signals AH0, AH4, AH8 and AH12 is selected and provided to the channel CH0, the input signals AH1, AH9 or AV1, the calibration signal Call or the weighted power sum of the input signals AH1, AH5, AH9 and AH13 is selected and provided to the channel CH1, and so on. Furthermore, the input signals from the transmitting channels TX_CH6 and TX_CH7 are selected and provided to the channels RXA and RXB, respectively.

In the bypass mode, the MUX networks 933 are configured to provide the input signals AV0 through AV7 as the input signals Ext0 through Ext7 to the power combiner 935 and the power divider 937, so as to provide the sum of the input signals AV0 through AV7 to the channels RXA and RXB. Furthermore, no input signal is selected and provided to the channels CH0 through CH7. After obtained the sum of the input signals AV0 through AV7 in the channels RXA and RXB, the extender 960 is configured to identify the information of radio-emitting sources.

In the jamming mode, the MUX network 933 is configured to select one of the input signals, or the combined input signal to the corresponding channel. For example, the input signals AH0, AH8 or AV0 or the weighted power sum of the input signals AH0, AH4, AH8 and AH12 is selected and provided to the channel CH0, the input signals AH1, AH9 or AV1 or the weighted power sum of the input signals AH1, AH5, AH9 and AH13 is selected and provided to the channel CH1, and so on. Furthermore, no input signal is selected and provided to the channels RXA and RXB. After obtaining location information (e.g., the azimuth and the elevation of the radio-emitting source) of the radio-emitting sources according to the selected input signal in each of the channels CH0 through CH7, the processor 150 is configured to transmit the output signal toward the radio-emitting source for interfering with the radio-emitting sources in TX mode, and the transmitted output signal has larger energy (or power) and the frequency corresponding to the selected output signal.

In the embodiments, the RF phased-array detectors have the vertical antennas arranged in a line and the horizontal antennas arranged in the symmetrical shape on the plane. By detecting the input signals received from the vertical and horizontal antennas, the azimuth and the elevation of the input signals are obtained by the RF phased-array detector. Furthermore, by using the MUX networks to select one or more than one of the input signals to individual channel, the RF phased-array detectors can increase the number of vertical and horizontal antennas to receive more input signals without increasing the number of channels, thereby improving accuracy of detection and decreasing the manufacturing costs.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A radio frequency (RF) phased-array detector, comprising:

a vertical antenna array comprising a plurality of vertical antennas, wherein each of the vertical antennas is configured to obtain a first input signal in response to a wireless signal from a radio-emitting source;

a horizontal antenna array comprising a plurality of horizontal antennas, wherein each of the horizontal antennas is configured to obtain a second input signal in response to the wireless signal;

a multiplexer module comprising a plurality of switching units coupled to the vertical antenna array and the horizontal antenna array, and configured to provide a plurality of third input signals selected from the first input signals and the second input signals through the switching units;

a processor configured to obtain azimuth and elevation of the radio-emitting source according to the third input signals; and a filter module, comprising a plurality of filter banks, wherein each of the filter banks is coupled to the multiplexer module through a first input/output (I/O) terminal and the processor through a second I/O terminal and comprises:

a plurality of first band-pass filters having different first passbands; and a plurality of second band-pass filters having different second passbands, wherein each of the filter banks is configured to select one band-pass filter from among the plurality of first band-pass filters and the plurality of second band-pass filters, and to couple the selected band-pass filter between the first I/O terminal and the second I/O terminal without passing through the unselected band-pass filters, so as to filter one of the third input signals, wherein the second band-pass filters are divided into a plurality of groups corresponding to the first band-pass filters, and the first passband of each of the first band-pass filters only overlaps with the second passbands of the corresponding group of the second band-pass filters.

2. The RF phased-array detector of claim 1, wherein each of the vertical antennas has an omnidirectional antenna pattern, and each of the horizontal antennas has a directional antenna pattern.

3. The RF phased-array detector of claim 1, wherein the multiplexer module comprises a plurality of multiplexer networks, wherein each of the multiplexer networks is configured to provide at least one of the third input signals.

4. The RF phased-array detector of claim 3, wherein each of the multiplexer networks is configured to provide a single input signal to serve as one of the third input signals according to the first and second input signals.

5. The RF phased-array detector of claim 3, wherein each of the multiplexer networks is configured to provide a combined input signal to serve as one of the third input signals according to the second input signals.

6. The RF phased-array detector of claim 1, wherein the processor is configured to obtain the azimuth and the elevation of the radio-emitting source according to the third input signals filtered by each of the first band-pass filters and the third input signals filtered by the second band-pass filters corresponding to one of the first band-pass filters.

7. The RF phased-array detector of claim 1, wherein the vertical antennas are arranged in a straight line, and the horizontal antennas are arranged in a plane non-parallel to the straight line.

8. The RF phased-array detector of claim 7, wherein the horizontal antennas are arranged in a circle on the plane, and respective antenna patterns of the horizontal antennas are symmetric about a center of the circle.

9. The RF phased-array detector of claim 7, wherein the straight line is perpendicular to the plane, and one or more the vertical antennas are disposed over the plane.

10. A radio frequency (RF) phased-array detector, comprising:

a first antenna array comprising a plurality of first antennas arranged in a straight line, wherein each of the first antennas is configured to obtain a first input signal in response to a wireless signal from a radio-emitting source;

a second antenna array comprising a plurality of second antennas arranged in a plane non-parallel to the straight line, wherein each of the second antennas is configured to obtain a second input signal in response to the wireless signal;

a multiplexer network comprising a plurality of switching units coupled to the first antenna array and the second antenna array, and configured to provide a third input signal according to the first and second input signals through the switching units;

a processor configured to obtain azimuth and elevation of the radio-emitting source according to the third input signal; and a filter bank coupled to the multiplexer network through a first input/output (I/O) terminal and the processor through a second I/O terminal, and comprising:

a plurality of first band-pass filters having different first passbands; and a plurality of second band-pass filters having different second passbands, wherein the filter bank is configured to select one band-pass filter from among the plurality of first band-pass filters and the plurality of second band-pass filters, and to couple the selected band-pass filter between the first I/O terminal and the second I/O terminal without passing through the unselected band-pass filters, so as to filter the third input signal, wherein the second band-pass filters are divided into a plurality of groups corresponding to the first band-pass filters, and the first passband of each of the first band-pass filters only overlaps with the second passbands of the corresponding group of the second band-pass filters, wherein in a first mode, the third input signal is a single input signal selected from the first and second input signals, and in a second mode, the third input signal is a combined input signal comprising more than one of the second input signals.

11. The RF phased-array detector of claim 10, wherein the second antennas are arranged in a circle on the plane, and respective antenna patterns of the second antennas are symmetric about a center of the circle.

12. The RF phased-array detector of claim 11, wherein in the second mode, the multiplexer network is configured to provide the third input signal by combining more than two of the second input signals.

13. The RF phased-array detector of claim 12, wherein the second antennas corresponding to the combined second input signals are symmetrically distributed in the circle.

14. The RF phased-array detector of claim 10, wherein each of the first antennas has an omnidirectional antenna pattern, and each of the second antennas has a directional antenna pattern.

15. The RF phased-array detector of claim 10, wherein the straight line is perpendicular to the plane, and one or more of the first antennas are disposed over the plane.

16. The RF phased-array detector of claim 10, wherein the processor is configured to obtain the azimuth and the elevation of the radio-emitting source according to the third input signals filtered by each of the first band-pass filters and the third input signals filtered by the second band-pass filters having the second passbands corresponding to one of the first band-pass filters.

17. The RF phased-array detector of claim 1, wherein each of the filter banks further comprises:

a first switching unit coupled to the first I/O terminal, configured to selectively provide the one of the third input signals from the first I/O terminal to the selected band-pass filter, so as to filter the one of the third input signals; and a second switching unit coupled to the second I/O terminal, configured to selectively couple to the selected band-pass filter, so as to provide the filtered third input signal from the selected band-pass filter to the processor.

18. The RF phased-array detector of claim 10, wherein the filter bank further comprises:

a first switching unit coupled to the first I/O terminal, configured to selectively provide the third input signal from the first I/O terminal to the selected band-pass filter, so as to filter the third input signal; and a second switching unit coupled to the second I/O terminal, configured to selectively couple to the selected band-pass filter, so as to provide the filtered third input signal from the selected band-pass filter to the processor.

* * * * *